(12) United States Patent
Grumstrup et al.

(10) Patent No.: US 6,192,321 B1
(45) Date of Patent: Feb. 20, 2001

(54) METHOD OF AND APPARATUS FOR DETERMINISTICALLY OBTAINING MEASUREMENTS

(75) Inventors: Bruce F. Grumstrup, Marshalltown; Kenneth W. Junk, Ames; Jimmie L. Snowbarger; Eugene R. Taylor, Jr., both of Marshalltown, all of IA (US)

(73) Assignee: Fisher Controls International, Inc., Clayton, MO (US)

( * ) Notice: Under 35 U.S.C. 154(b), the term of this patent shall be extended for 0 days.

(21) Appl. No.: 08/938,459

(22) Filed: Sep. 29, 1997

(51) Int. Cl.[7] .................................................. G01L 25/00
(52) U.S. Cl. ............................... 702/113; 702/33; 702/36; 702/79; 702/89; 700/32; 700/33; 700/34; 700/37; 73/1.72; 73/865.9; 137/487.5; 137/1; 137/392; 137/551; 307/112; 307/115; 307/116; 307/117; 307/118; 307/119
(58) Field of Search .................... 702/113, 33, 36, 702/79, 89, 94, 104, 114–116, 121–125, 150, 176–179, 182–185, 189, FOR 123, FOR 124, FOR 139, FOR 144; 700/32–34, 37, 39, 51, 52, 56, 64–66, 69, 78–81, 275, 282, 302; 73/1.72, 865.9, 168; 137/487.5, 1, 392, 551, 552.7, 553, 554, 557; 307/112, 115–119

(56) References Cited

U.S. PATENT DOCUMENTS

| 4,029,122 | 6/1977 | Jaegtnes ............... 137/551 |
| 4,313,465 | 2/1982 | Holzem et al. ............... 137/599 |
| 4,376,450 | 3/1983 | Fayfield et al. ............... 137/554 |
| 4,523,286 | 6/1985 | Koga et al. ............... 364/494 |
| 4,542,649 | 9/1985 | Charbonneau et al. ............... 73/168 |

(List continued on next page.)

FOREIGN PATENT DOCUMENTS

| 42 18 320 | 6/1992 | (DE) . |
| 42 32 826 | 10/1993 | (DE) . |
| 0 275 629 | 7/1988 | (EP) . |
| 0 315 391 A2 | 5/1989 | (EP) . |
| 0 462 432 | 12/1991 | (EP) . |

(List continued on next page.)

OTHER PUBLICATIONS

Haynes et al., Motor Current Signature Analysis Method for Diagnosing Motor–Operated Devices, pp. 1–24, No date.*
Beatty, "Intelligent Valve Based Process Sensing and Control," ISA, 46 *Advances in Instrumentation and Control* No. 2, pp. 1175–1185 (1991), (No month).

(List continued on next page.)

*Primary Examiner*—Hal Wachsman
(74) *Attorney, Agent, or Firm*—Marshall, O'Toole, Gerstein, Murray & Borun (57) ABSTRACT

A diagnostic test unit for deterministically measuring one or more parameters, such as dead band, dead time, response time, gain, or overshoot, of a process control device that is connected in a process control loop during operation of a process includes a switch controller, a signal generator, a switch, a response accumulator mechanism, and an analyzer mechanism. The switch controller monitors a process signal during operation of the process to determine whether the process signal is substantially stable. In the event that the process signal is substantially stable, the switch replaces a control signal with a diagnostic test signal generated by the signal generator. The response accumulator is in communication with the process control loop to obtain an indication of the response of the process control device to the diagnostic test signal. The analyzer unit then determines the device parameter from the test signal and the response indication.

32 Claims, 7 Drawing Sheets

U.S. PATENT DOCUMENTS

| | | | |
|---|---|---|---|
| 4,555,766 | 11/1985 | Wright | 364/426 |
| 4,590,963 | 5/1986 | Gardner et al. | 137/554 |
| 4,615,722 | 10/1986 | Steffan et al. | 65/158 |
| 4,617,960 | 10/1986 | More | 137/554 |
| 4,660,416 | 4/1987 | Charbonneau et al. | 73/168 |
| 4,672,529 | 6/1987 | Kupersmit | 364/130 |
| 4,690,003 | 9/1987 | McNennamy et al. | 73/862.32 |
| 4,693,113 | 9/1987 | McNennamy et al. | 73/168 |
| 4,694,390 | 9/1987 | Lee | 364/165 |
| 4,694,391 | 9/1987 | Guttag et al. | 364/200 |
| 4,712,071 | 12/1987 | Charbonneau et al. | 324/415 |
| 4,742,713 | 5/1988 | Abe et al. | 73/620 |
| 4,831,873 | 5/1989 | Charbonneau et al. | 73/168 |
| 4,833,593 | 5/1989 | Takeuchi et al. | 364/191 |
| 4,858,103 | 8/1989 | Takeuchi et al. | 364/174 |
| 4,908,774 | 3/1990 | Lund et al. | 364/507 |
| 4,908,775 | 3/1990 | Palusamy et al. | 364/508 |
| 4,916,628 | 4/1990 | Kugler | 364/492 |
| 4,926,903 | 5/1990 | Kawai | 137/554 |
| 4,949,288 | 8/1990 | Bookout | 364/558 |
| 4,976,144 | 12/1990 | Fitzgerald | 73/168 |
| 4,977,778 | 12/1990 | Nafziger et al. | 73/597 |
| 4,980,825 | 12/1990 | Tootell et al. | 364/580 |
| 5,000,040 | 3/1991 | Charbonneau et al. | 73/168 |
| 5,086,273 | 2/1992 | Leon | 324/207 |
| 5,109,692 | 5/1992 | Fitzgerald | 73/168 |
| 5,140,263 | 8/1992 | Leon | 324/207 |
| 5,154,080 | 10/1992 | Hill et al. | 73/597 |
| 5,159,835 | 11/1992 | Nafziger et al. | 73/584 |
| 5,197,328 | 3/1993 | Fitzgerald | 73/168 |
| 5,198,973 | 3/1993 | Stautermann | 364/167.01 |
| 5,228,342 | 7/1993 | McShane | 73/597 |
| 5,233,542 | 8/1993 | Höhner et al. | 364/551.01 |
| 5,251,148 | 10/1993 | Haines et al. | 364/509 |
| 5,253,185 | 10/1993 | Mutchler et al. | 364/551.01 |
| 5,272,647 | 12/1993 | Hayes | 364/551.01 |
| 5,320,123 | 6/1994 | Corso et al. | 137/1 |
| 5,329,465 | 7/1994 | Arcella et al. | 364/551.01 |
| 5,329,956 | 7/1994 | Marriott et al. | 137/15 |
| 5,337,262 | 8/1994 | Luthi et al. | 364/580 |
| 5,396,167 | 3/1995 | Leon | 324/73.1 |
| 5,414,648 | 5/1995 | Morgan et al. | 364/563 |
| 5,425,270 | 6/1995 | McDonald et al. | 73/168 |
| 5,433,245 | 7/1995 | Prather et al. | 137/554 |
| 5,451,923 | 9/1995 | Seberger et al. | 340/310.06 |
| 5,475,299 | 12/1995 | Leon | 324/73.1 |
| 5,477,149 | 12/1995 | Spencer et al. | 324/418 |
| 5,487,302 | 1/1996 | Casada et al. | 73/168 |
| 5,555,171 | 9/1996 | Sonehara | 364/424.03 |
| 5,557,546 | 9/1996 | Fukai et al. | 364/551.01 |
| 5,564,470 | 10/1996 | Denmark et al. | 137/554 |
| 5,586,305 | 12/1996 | Eidson et al. | 395/500 |
| 5,665,898 | * 9/1997 | Smith et al. | 73/1.72 |
| 5,687,098 | 11/1997 | Grumstrup et al. | 364/551.01 |
| 5,748,469 | * 5/1998 | Pyötsiä | 702/185 |
| 5,878,765 | * 3/1999 | Lange | 137/487.5 |

FOREIGN PATENT DOCUMENTS

| | | |
|---|---|---|
| 0 572 245 | 12/1993 | (EP). |
| 0 637 713 | 2/1995 | (EP). |
| 0 660 017 | 6/1995 | (EP). |
| 0 708 389 | 4/1996 | (EP). |
| 2 194 648 | 3/1988 | (GB). |
| 2 196 445 | 4/1988 | (GB). |
| 62 229044 | 10/1987 | (JP). |
| WO 97/16776 | 5/1997 | (WO). |

OTHER PUBLICATIONS

Fieldvue™, "Digital Valve Controller Type DVC5000 Series," Instruction Manual, Jun. 1995, pp. 1–38.

Fieldvue™, "Digital Vave Controller Type DVC5000 Series," Bulletin 62.1:DVC5000, Jun. 1994, pp. 1–12.

Fieldvue™, "Digital Valve Controller DVC5000 Series Remotely Accessible Information," Bulletin 62.1:DVC5000(S1), Jun. 1995, pp. 1–2.

Charbonneau, Arthur G., "Early Diagnosis of Motor Operated Valve Mechanical and Electrical Degradations," The American Society of Mechanical Engineers, 84–NE–16, 1984, pp. 1–6, (No month).

Dimmick, Joseph, et al., "Ultrasonic Leak Detection Cuts Valve Maintenance Costs," Power Engineering, pp. 35–38, Aug. 1986.

Electric Power Research Institute, "Improvements in Motor–operated Valves," EPRI NP–4254, Nov. 1985, pp. 1–10, Report Summary, Abstract and Table of Contents only.

Electric Power Research Institute, "Key Valves Prioritization Study," EPRI NP–3611, Oct. 1984, pp. 1–5, Abstract and Table of Contents only.

* cited by examiner

METHOD OF AND APPARATUS FOR DETERMINISTICALLY OBTAINING MEASUREMENTS

TECHNICAL FIELD

The present invention relates generally to process control system diagnostics and, more particularly, to a method of and an apparatus for deterministically obtaining measurements of one or more parameters of a process control device connected within an operating process environment.

BACKGROUND ART

Large scale commercial manufacturing and refining processes typically use a process controller to control the operation of one or more process control devices such as control valves which, in turn, control one or more process variables, such as fluid flow, temperature, or pressure within the process. Generally, a process control valve has an actuator controlled by a positioner that moves an associated control element, such as a valve plug, a damper, or some other alterable opening member, in response to a control signal generated by the process controller. The control element of a control valve may, for example, move in response to changing fluid pressure on a spring-biased diaphragm or a piston head or in response to the rotation of a shaft, each of which may be caused by a change in the control signal. In one standard valve mechanism, a control signal with a magnitude varying in the range of 4 to 20 mA (milliamperes) causes a positioner to alter the amount of fluid and thus, the fluid pressure, within a pressure chamber in proportion to the magnitude of the control signal. Changing fluid pressure in the pressure chamber causes a diaphragm to move against a bias spring which, in turn, causes movement of a valve plug coupled to the diaphragm.

Process control devices usually develop or produce a feedback signal indicative of the response of the device to the control signal and provide this feedback signal (or response indication) to the process control device for use in controlling a process. For example, control valves typically produce a feedback signal indicative of the position (e.g., travel) of a valve plug or other moveable valve member.

Even though control valves may use these feedback signals to perform functions within a process control loop, it has been discovered that poor control loop performance may still be caused by poor operating conditions at the control valve. In many cases, problems associated with the individual process control devices cannot be tuned out of the control loop by the process controller and, as a result, the poorly performing control loops are placed in manual or are detuned to the point where they are effectively in manual. In this case, the processes associated with these control loops require constant supervision by one or more experienced human operators, which is undesirable.

Poor control loop performance can usually be overcome by monitoring the operational condition or the "health" of the process control devices connected within a process loop, and repairing or replacing the poorly performing process control devices. The health of a process control device can be determined by measuring one or more parameters associated with the process control device and determining if the one or more parameters is outside of an acceptable range.

One process control device parameter that may be used to determine, and that is indicative of, the health of a process control device is dead band. Generally speaking, in process instrumentation, dead band is the range through which an input signal may be varied, upon reversal of direction, without initiating an observable change in an output signal. Dead band, which may be caused by the physical play between mechanically interconnected components, friction, and/or other known physical phenomena, is best observed when a control signal causes a reversal in the direction of movement of a moveable element of a process control device. During this reversal, the control signal undergoes a discrete amount of change (dead band) before the moveable element of the process control device actually exhibits movement in the new direction. Put another way, the difference between the value of the control signal at which movement of the process control device element in a first direction last occurred and the value of the control signal at which the movement of the process control device element first occurs in a second and different direction is a measure of the dead band of the process control device.

Figure 1:
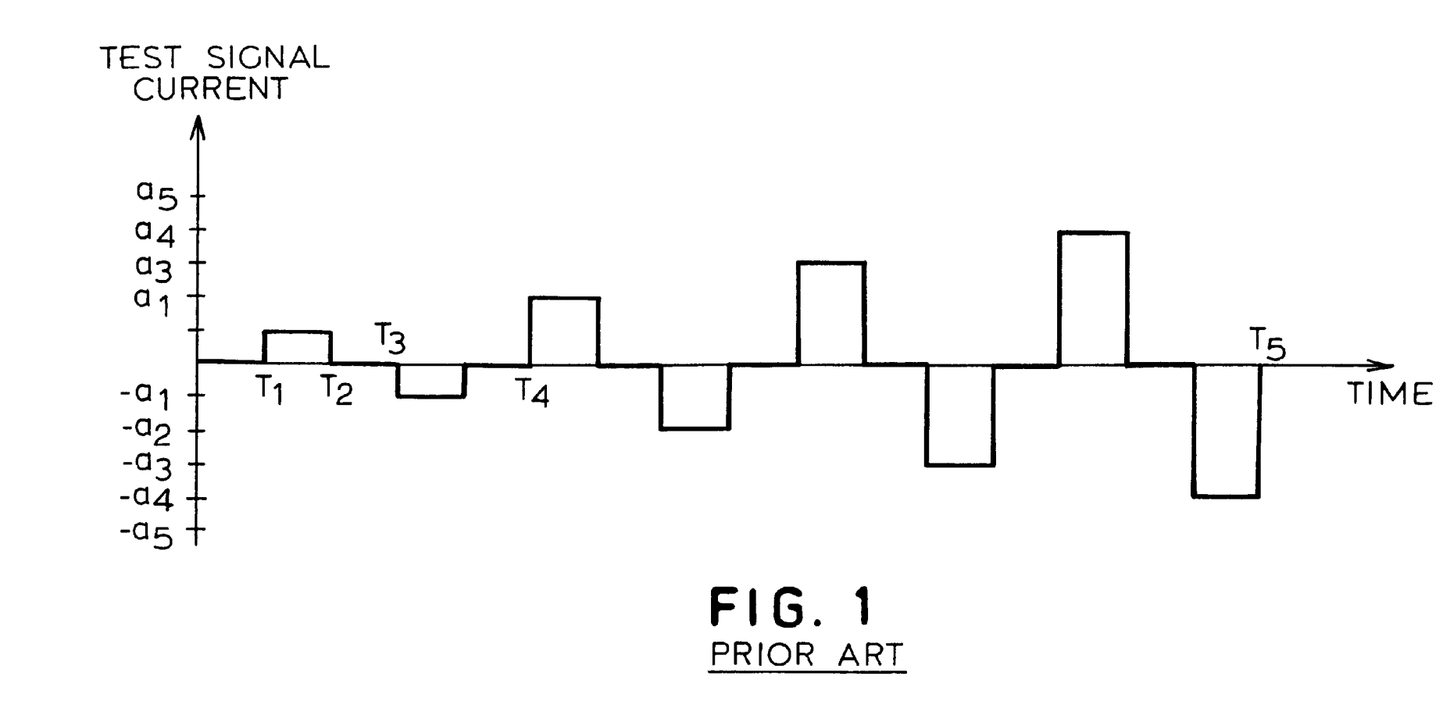
FIG. 1 comprises a graph of a prior art deterministic test signal that may be used by the diagnostic test unit of the present invention to measure the dead band of a process control device.

Referring to FIG. 1, rough estimates of the dead band have been obtained by applying a blocked sinusoidal signal to a process control device. The blocked sinusoidal signal includes periods of alternating steps of equal magnitude that increase in amplitude from period to period, such as 1%, 2%, 5%, and so on. Once movement of the valve element or the process variable occurs following a reversal of direction, the amplitude of the step (doubled) provides an upper bound on the dead band. The lower bound is provided by the amplitude of the steps in the preceding period.

Other device parameters that may be used to determine the health of a process control device are dead time, response time, gain, and overshoot. Dead time is associated with, and may be considered to be a measurement of the amount of time it takes the process control device to actually begin moving a moveable element in response to a change in a control signal. Response time is the amount of time it takes the moveable element of a process control device to reach a certain percentage, for example, 63 percent, of its final value in response to a change in a control signal. The gain of a process control device is indicative of the amount of amplification caused by a change in the control signal. The gain may be expressed as the ratio of relative change in valve travel to relative change in the control signal. The overshoot of a process control device indicates how much a valve travels beyond its eventual steady-state position.

If the dead band, dead time, response time, or other process control device parameter(s) of a process control device increase a significant amount over their nominal values, it may be necessary to repair or replace the process control device to establish adequate control within the process control loop. However, it is not usually very easy to measure process control device parameters, such as dead band, dead time, response time, gain, and overshoot to monitor the health of functioning process control devices when those devices are connected on-line within a control loop.

In the past, operators have had to remove a process control device from a control loop to bench test the device or, alternatively, control loops have been provided with bypass valves and redundant process control devices to make it possible to bypass a particular process control device to thereby test that device while the process is operating. Otherwise, operators have had to introduce significant perturbations into the process operation or wait until a process is halted or is undergoing a scheduled shut-down to test the individual process control devices within the process. Each of these options is time consuming, expensive, and potentially disruptive to the process, while still only providing intermittent measurement of the parameters of the individual process control devices required to determine the operating condition of those control devices.

SUMMARY OF THE INVENTION

The present invention is directed to a method of and an apparatus for deterministically measuring one or more device parameters, such as dead band, dead time, response time, gain, or overshoot, of a process control device connected within a process while the process is operating (i.e., while the process is on-line). Operation of the method and apparatus of the present invention enables a process operator to monitor the health or operating condition of a process control device within a process without having to remove the process control device from the control loop, without having to bypass the process control device in the control loop and without having to shut the process down or interfere with the process in any other significant way. To this end, diagnostic testing in accordance with the present invention is preceded by a determination that the impact on the process will likely be minimal.

According to one aspect of the present invention, a diagnostic test unit determines a device parameter associated with a process control device that is disposed within an operating process. The diagnostic test unit includes a switch controller that monitors a process signal during operation of the process. The diagnostic test unit further includes a signal generator that generates a diagnostic test signal and a switch responsive to the switch controller and operable to replace a control signal for the process control device with the diagnostic test signal during operation of the process. The apparatus further includes a mechanism for obtaining an indication of the response of the process control device to the diagnostic test signal and an analyzer unit that determines the device parameter from the diagnostic test signal and the response indication.

The process control device may be a control valve having a moveable valve member. In that event, the response indication is preferably a position signal generated by a position sensor in communication with the valve member, the position signal being representative of the position of the valve member. The position signal may also serve as the process signal monitored by the switch controller.

According to another aspect of the present invention, a method of determining a device parameter associated with a process control device while the process control device is disposed within an operating process includes the steps of monitoring a process signal during operation of the process and determining whether the process signal is substantially stable. The method further includes the steps of generating a diagnostic test signal and replacing the control signal with the diagnostic test signal during operation of the process if the process signal is substantially stable. An indication of the response of the process control device to the diagnostic test signal is then received and the device parameter is determined therefrom.

DETAILED DESCRIPTION

Figure 2:
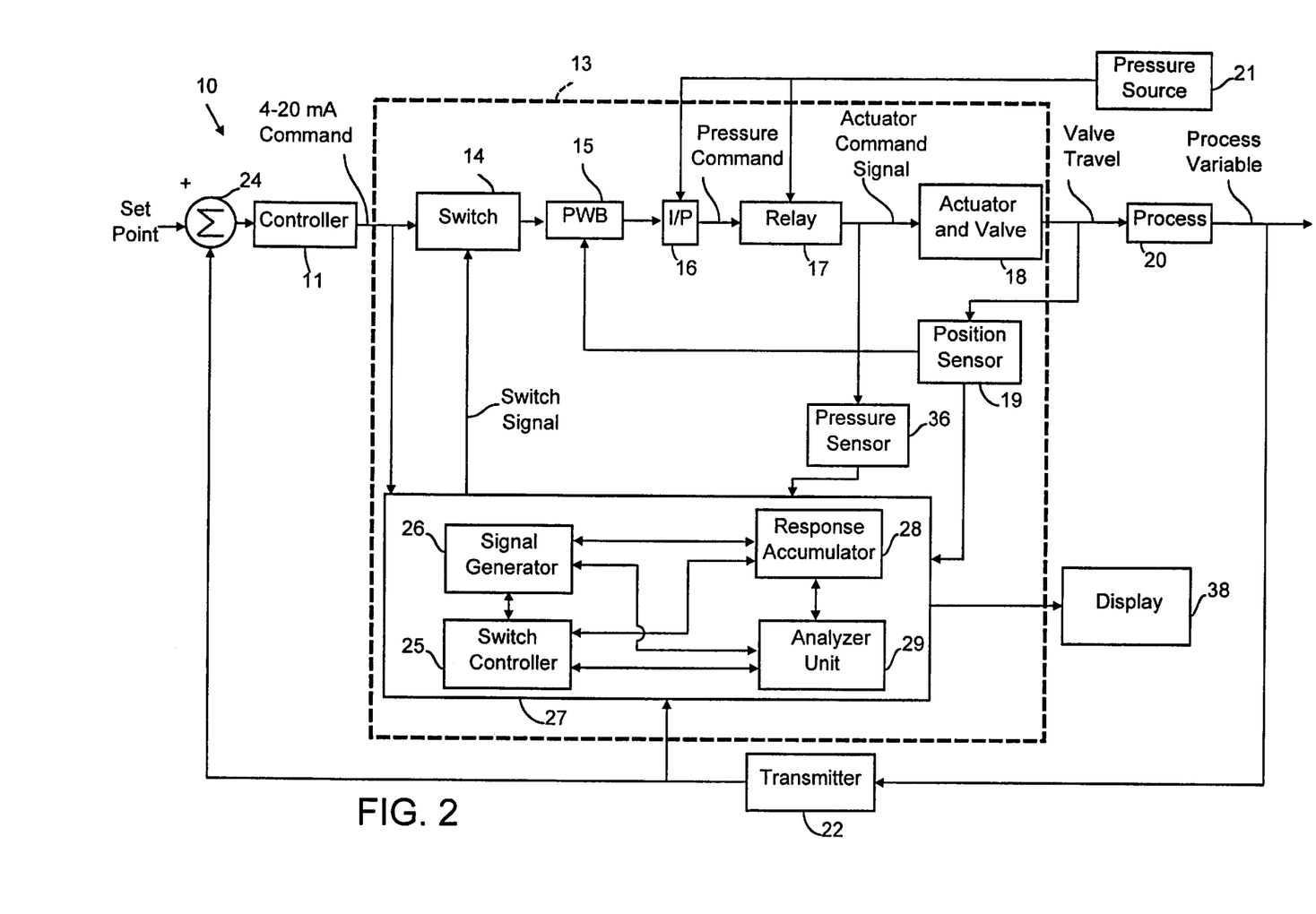
FIG. 2 comprises a block diagram of a process control device disposed in a control loop wherein the process control device comprises a diagnostic test unit according to the present invention disposed within a control loop.

Referring to FIG. 2, a single-input, single-output process control loop 10 includes a process controller 11 that sends, for example, a 4 to 20 mA control signal to a process control device 13. The process control device 13 is illustrated as a control valve device including a switch 14, a printed wiring board (PWB) 15, a current-to-pressure transducer (I/P) 16, a relay 17, and an actuator/valve assembly 18. During normal operation, the control signal from the controller 11 is provided to the PWB 15 through the switch 14. A position sensor 19 provides a feedback signal to the PWB 15 indicative of the movement and position of a moveable valve member (not shown) disposed within the actuator/valve assembly 18. The position of the valve member controls a process variable within a process 20.

The PWB 15 executes a control algorithm in accordance with the incoming control and feedback signals to develop a signal for the currentto-pressure transducer 16, which, in turn, develops a corresponding pressure signal. The pressure signal is amplified by the relay 17, which may comprise a poppet valve or, more generally, any pneumatic amplifier. The amplified pressure signal pneumatically controls an actuator (not shown) within the actuator/valve assembly 18 to move the valve member to the desired position. Both the current-to-pressure transducer 16 and the relay 17 develop the respective pressure signals using a pressure source 27 coupled to the process control device 13.

The position sensor 19 may comprise any desired motion or position measuring device including, for example, a potentiometer, a linear variable differential transformer (LVDT), a rotary variable differential transformer (RVDT), a Hall effect motion sensor, a magneto restrictive motion sensor or a variable capacitor motion sensor. If desired, the process control device 13 may include other types of valve mechanisms or elements instead of or in addition to those illustrated in FIG. 1, including, for example, a separate pneumatic positioner and I/P unit. Furthermore, it should be understood that the process control device 13 may be any other type of device, such as a damper or a fan, that controls a process variable in any other desired or known manner.

As illustrated in FIG. 1, a transmitter 22 measures the process variable of the process 20 and transmits an indication of the measured process variable to a summing junction 24. The summing junction 24 compares the measured value of the process variable (converted into a normalized percentage) to a set point to produce an error signal indicative of the difference therebetween and provides this error signal to the process controller 11. The set point, which may be generated by a user, an operator or another controller (not shown), is typically normalized to be between 0 and 100 percent and indicates the desired value of the process variable. During normal operation of the process 20, the process controller 11 uses the error signal to generate the control signal according to any desired technique and delivers the control signal to the process control device 13 to control the process variable.

In accordance with the present invention, a diagnostic test routine, which may be preprogrammed, is implemented to test the process control device 13 under normal process operating conditions, i.e., while the process 20 is on-line. In the event that it has been determined that implementation of the diagnostic test routine would have a minimal impact on the process 20, the diagnostic test routine disconnects the process control device 13 from the controller 11 and forces the process control device 13 to perform a predetermined or deterministic set of operations designed to impact the process 20 only minimally, if at all. The routine also receives, measures, or collects information indicative of the response of the process control device 13 to the diagnostic test signal and then reconnects the process control device 13 to the controller 11, all within a limited amount of time to avoid disturbing normal operation of the process 20 in any substantial way. The collected information may be used to calculate process control device parameters such as dead band, dead time, response time, gain, and overshoot, in the interest of determining the operating condition of the process control device 13. Because the diagnostic routine is implemented while the process 20 is on-line, the "health" or operating condition of the process control device 13 is determined without isolating or bypassing the process control device 13 and/or shutting the process 20 down.

When a diagnostic test of the process control device 13 is to be run according to the present invention, a switch controller 25 generates (or modifies) a switch signal to toggle the switch 14 from a first position (or state) in which the switch 14 provides the control signal from the controller 11 to the PWB 15 to a second position (or state) in which the switch 14 disconnects the controller 11 and, therefore, the control signal, from the PWB 15 and connects the PWB 15 to the output of a signal generator 26, which produces a deterministic (i.e., known or predetermined), diagnostic test signal. As set forth above, even though the switch controller 25 replaces the control signal with the diagnostic test signal, the process 20 remains on-line during the diagnostic test routine.

Both the switch controller 25 and the signal generator 26 are part of a diagnostic test unit 27, which may be internal to the process control device 13 as shown in FIG. 2 or, alternatively, may be an external test apparatus coupled to the process control device 13. Similarly, the switch 14 may be internal or external to the process control device 13.

The diagnostic test unit 27 further includes a response accumulator 28 that collects or receives one or more indications of the response of the process control device 13 to the diagnostic test signal. The response accumulator 28 may comprise a memory or storage device that stores the response indication(s) to supply data representative of the response indication(s) to an analyzer unit 29. The analyzer unit 29, which may also receive data representative of the diagnostic test signal from the signal generator 26, analyzes the test signal and response indication data to determine one or more desired process control device parameters.

As illustrated in FIG. 1, the response accumulator 28 may receive a response indication indicative of valve movement or position (valve travel) from the position sensor 19. Alternatively, or in addition, the response accumulator 28 may receive, as a response indication, the actuator command signal developed by the relay 17 (via a pressure sensor 36), and/or any other signal specifying or related to the control of the process control device 13 such as the output of the transmitter 22 indicating the value of the process variable. It should be noted that other types of process control devices may have other signals or phenomena associated therewith that may also indicate a response to a diagnostic test signal. Thus, in general, the response accumulator 28 may collect or receive any signal or phenomena that indicates the movement or operation of the process control device 13 in response to a change in the diagnostic test signal. However, some response indications, such as the valve position, may provide more accurate estimates of the device parameters by avoiding sources of noise (e.g., process noise) not associated with the process control device 13 being tested. On the other hand, farther removed response indications, such as the process variable, may exhibit delays unrelated to the health or performance of the process control device 13 that should still be considered. Therefore, certain response indications (or combinations thereof) may be preferable in certain situations.

In order to determine whether to initiate a diagnostic test, the switch controller 25 monitors a signal associated with the process 20 while the process 20 is on-line to determine whether the process variable or process control device 13 is substantially stable. The monitored process signal may be received via the response accumulator 28 or collected by the switch controller 25 directly. The process signal may be the control signal, the valve member position, the process variable, or any other variable or signal that provides an indication of the extent to which the process control device 13, the process variable, and/or the set point is quiescent. If the set point, the control signal or other variable is found to be fluctuating, or fluctuating to a great extent, the diagnostic test routine will not be initiated. More than one variable within the process loop 10 may be monitored by the switch controller 25 in the interest of improving the accuracy of the determination and in the interest of minimizing the effects of implementing the diagnostic test routine while the process 20 is on-line.

The stability of the monitored process signal(s) is indicative of the stability of the process variable, the process control device 13, or the set point. A substantially stable or quiescent process signal may still fluctuate to a certain extent even though the process variable, the process control device 13, or the set point is stable. Thus, the "substantially stable" determination should at least allow for noise inherent in the signal. A diagnostic test routine should not be implemented if the process signal is changing to an extent that would be indicative of significant changes to the process 20 or the process variable. As a result, whether the monitored process signals would be considered substantially stable or quiescent depends, to a large extent, on the signal(s) used as the monitored process signal. For example, a diagnostic test routine might still be implemented when a control signal is fluctuating up to and beyond 5% in certain process control loops, while a routine might be detrimental to the process 20 if the process variable is varying as little as 1% in other process control loops. These differences may be the result of the nature of the process 20 and/or process variable, or stem from a large differential in dead bands between different process control devices 13. Depending on the health and/or quality of the actuator/valve assembly 18, a large dead band may allow diagnostic test routines to be run with control signal variances as large as 10%. Moreover, a low sensitivity of the process 20 to the process variable may push the allowable variance even higher.

The diagnostic test unit 27, and any component thereof, including the switch controller 25, the signal generator 26, the response accumulator 28 and/or the analyzer unit 29, may be implemented in hardware, software, firmware, or any combination thereof. If implemented in software, the components of the diagnostic test unit 27 may be stored in any memory device, such as a floppy disk, hard drive, CD-ROM, RAM, ROM, EEPROM or any other storage medium known to those skilled in the art, and, if desired, may be supplied from a remote location via any communications medium, such as transmission via telephone lines, the Internet, an Ethernet, or any other type of communications network known to those skilled in the art. Similarly, the switch 14 may be implemented in hardware, software, firmware, or any combination thereof.

If desired, the analyzer unit 29 may compare the determined process control device parameters with one or more stored values to determine if the measured parameters are acceptable or are within one or more specified ranges. If the process control device parameters are not within the one or more specified ranges, the analyzer unit 29 or other component of the diagnostic test unit 27 alerts a user via a display 38 comprising, for example, a CRT screen, a printer, a voice generator, an alarm, or any other desired communication device, that the process control device 13 may need to be repaired or replaced. Also, if desired, the analyzer unit 29 may provide a list of the measured device parameters to the user via the display 38.

The diagnostic test signal produced by the signal generator 26 may take on any desired shape that enables measurement of a process control device parameter. However, several diagnostic test signal waveforms described hereinbelow and illustrated in FIGS. 1, 3, and 4A–4D may be utilized to obtain parameter measurements in a manner that minimizes the potential for detrimentally interfering with the process 20. In general, the diagnostic test signal waveforms are plotted on a time axis to show the amplitude of the signal from a zero reference point that may constitute any DC level, including zero. For example, the amplitude values plotted in FIGS. 4A–4C may be representative of the amount that the diagnostic test signal amplitude deviates from the 4–20 mA command signal amplitude when the command signal is disconnected from the process control device 13. Some of the diagnostic test signals are also shown with a plot of an exemplar response indication showing movement of the response indication relative to zero, which may represent a position or a signal value at the initiation of the test routine.

Referring now to FIG. 1, a first diagnostic test signal useful in measuring process control device parameters (particularly dead band) comprises a pulsed sinusoidal signal having a sequence of steps arranged in a multiplicity of periods. Each period (e.g., from time $T_1$ to time $T_4$) may include a pair of alternating pulses which, more particularly, include a positive step (e.g., at time $T_1$), a return-to-zero (e.g., at time $T_2$), a negative step of the same magnitude (e.g., at time $T_3$) and another returnto-zero. Preferably, the magnitude of the pulses increases during successive periods.

To measure dead band using the pulsed sinusoidal signal of FIG. 1, the signal generator 26 first provides one or more periods of the alternating pulses until movement of, for example, the valve member is sensed by the position sensor 19 during both the positive and negative pulses of any particular period. The absolute difference between the amplitudes of the period (usually expressed in percent of span) during which movement of the valve member first occurs in response to both the positive and negative pulses is a measure of the dead band. Of course, this measurement actually over-estimates the dead band. The progression from low pulse amplitudes (e.g., $a_1$) to higher pulse amplitudes (e.g., $a_4$) provides lower and upper bounds for the dead band. Another routine for determining dead band may use movement sensed in multiple consecutive periods. For example, if movement is first sensed in a first direction (e.g., due to the negative pulse) of one period and is first sensed in a second direction due to the positive pulse of a later period, the difference between the negative pulse amplitude and the positive pulse amplitude (of the later period) may be used as a measure of the dead band of the device.

As will be understood, the pulsed sinusoidal signal of FIG. 1 allows the process control device 13 to be tested bidirectionally about a given operating point. The pulsed sinusoidal signal may also be utilized as an initialization or pre-test sequence to ensure that the process control device 13 is up against an edge of the dead band. The pulse amplitudes may increase linearly (as shown in FIG. 1), non-linearly, or in any other desired fashion. Furthermore, the frequency of the diagnostic test signal should remain low enough to ensure that the valve 18 (or other moveable element) has reached a steady-state between each one of the steps. The diagnostic test signal frequency will usually depend upon the particular process control device 13 being tested but, in general, may be as low as, for example, 0.2 Hz to 20 Hz.

Figure 3:
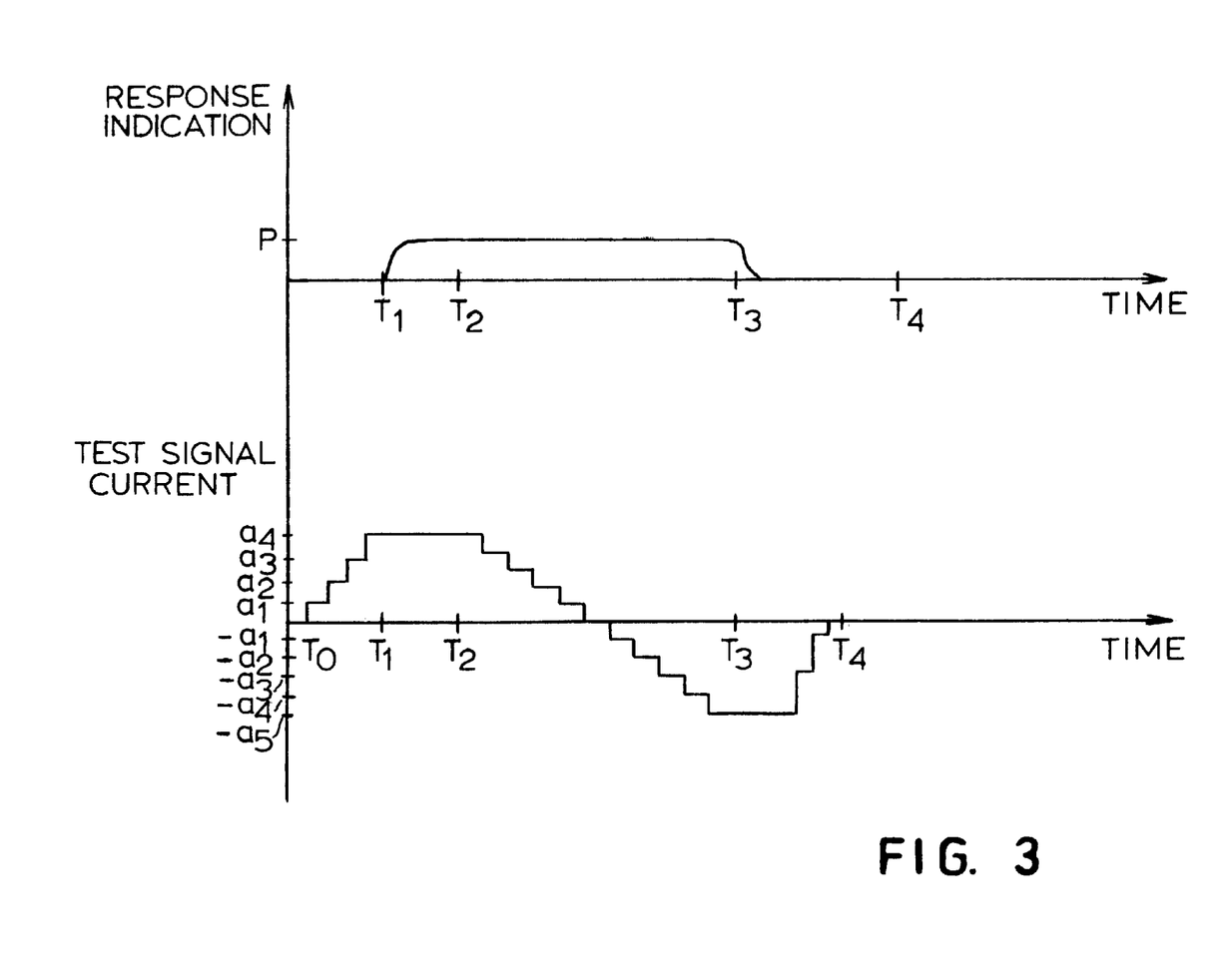
FIG. 3 comprises a graph of a diagnostic test signal and a response thereto used to measure the dead band of a process control device according to the present invention.

Referring now to FIG. 3, a second diagnostic test signal useful in measuring process control device parameters (particularly dead band) comprises a ramped step signal having an initialization phase, a test phase, and a post-test phase. At time $T_0$, the switch controller 25 initiates the diagnostic test by toggling the switch 14 and the signal generator 26 begins the initialization phase. In the initialization phase, the diagnostic test signal is increased (or decreased) in either linear or variable rate steps until movement of the valve element or other process variable is first detected (e.g., until time $T_1$). Valve element movement (i.e., the change in the response indication) is also shown as an amplitude relative to zero, which may represent any initial position or response indication value. The diagnostic test signal is then held constant while the valve element or process variable reaches a new, steady-state value (e.g., position P). The test phase commences at time $T_2$ and the direction of the diagnostic test signal is reversed. The test signal is then decreased (or increased) in either a linear or variable rate fashion until movement of the valve mechanism or process variable is detected for a second time (e.g., at time $T_3$). After this second movement, the dead band may be estimated as the absolute difference in the test signal amplitude between times $T_2$ and $T_3$.

Once the dead band has been estimated, the diagnostic test signal may return to zero at an accelerated rate in the post-test phase. For example, as shown in FIG. 3 after time $T_3$, the steps progress at a rate twice as fast as those during the test phase. Once the amplitude of the diagnostic test signal nears zero, the signal generator 26 may return the diagnostic test signal to zero at a normal rate if the double rate steps might overshoot zero. At time $T_4$, the diagnostic test is complete and the switch controller 25 may toggle the switch 14 to return control of the process control device 13 to the controller 11 or proceed with a different test routine.

Excessive deviation from the control signal amplitude (i.e., large deviations from zero) may result in detrimental interference with the process 20. Accordingly, it is preferred that the diagnostic test signal deviate from zero only to the extent necessary. This feat is accomplished in the diagnostic test routine shown in FIG. 3 through the use of very small steps (e.g., as low as 0.25% of span) throughout the test routine. In this manner, the edges of the dead band are reached and only barely surpassed such that the position (or value) P differs very little from the initial position (or value) represented by zero.

With such small test signal steps, the sensitivity in detecting valve movement (or a change in response indication) is of paramount importance. To this end, some signals may be preferable to others for use as the response indication. For example, monitoring valve element movement via the position sensor 19 may provide a more accurate estimate of the dead band of the actuator/value assembly 18 than the estimate provided by monitoring the process variable. Monitoring valve element movement may also be preferred because movement may be detected before the process variable has even changed, thereby minimizing the effect of the diagnostic test routine on the process 20 if the valve element can be quickly returned to its initial position.

As is evident from the foregoing discussion and FIGS. 1 and 3, the diagnostic test unit 27 and, in particular, the signal generator 26 are capable of providing a multitude of different diagnostic test signals. Moreover, each diagnostic test routine may comprise one or more different diagnostic test signals for determining multiple estimates of one or more device parameters. Obtaining multiple estimates of each device parameter is preferred because the device parameter estimates may vary depending upon whether the process control device 13 is moving through the dead band of the process control device 13. In light of this potential for error, or at the very least, variance, a diagnostic test signal may also include an initialization waveform that begins by moving the process control device 13 to one edge of the dead band.

If the dead band has been previously estimated, the signal generator 26 may then supply a diagnostic test signal comprising a step having an amplitude equal to the dead band plus an amount corresponding to, for example, one percent of the range of valve element movement. This step may be positive or negative and may be started anywhere within or on the edge of the dead band. In this manner, the step response should always be large enough to exceed the dead band. The response accumulator 28 and/or the analyzer unit 29 then may measure (1) the time until initial movement of the valve 18 to determine the dead time, (2) the time it takes for the valve 18 to move a predetermined percentage (e.g., 63%) of the full change in valve position to determine the response time, (3) the amount the valve 18 overshoots the desired steady-state value before finally reaching its actual steady-state value, and (4) the gain, if any, between the actual and desired steady-state values as a result of a change in the diagnostic test signal. In testing the response time of the process control device 13, the predetermined percentage may be specified by, for example, an operator, a control loop designer, or a component of the diagnostic test unit 27.

As is evident, the diagnostic test unit 27 includes a clock or other timing device to measure the dead time or the response time. It should be further noted that, for dead time and response time measurements (as well as any other measurement), the diagnostic test unit 27 may only wait for a predetermined period of time (e.g., three to four seconds) prior to terminating the diagnostic test and generating an error signal to alert the operator or user via the display 38 (FIG. 2) that the valve 18 may be malfunctioning. The time limit is also useful in avoiding detrimental interference with the process 20 by the diagnostic test routine. Of course, the amount of time that the diagnostic test unit 27 may be connected to the input of the process control device 13 will vary depending on the volatility of the control signal, as well as on other characteristics of the control loop 10.

In a preferred embodiment of the present invention, a diagnostic test routine includes four subroutines that are implemented to determine four measurements of the dead time, response time, gain, and overshoot. Each subroutine, which may be run independently or in conjunction with the other subroutines, assumes that an estimate of the dead band has been previously obtained by, and/or is stored in, the diagnostic test unit 27. The four subroutines are referred to herein as an Up/Up test, an Up/Down test, a Down/Down test, and a Down/Up test.

Figure 4A:
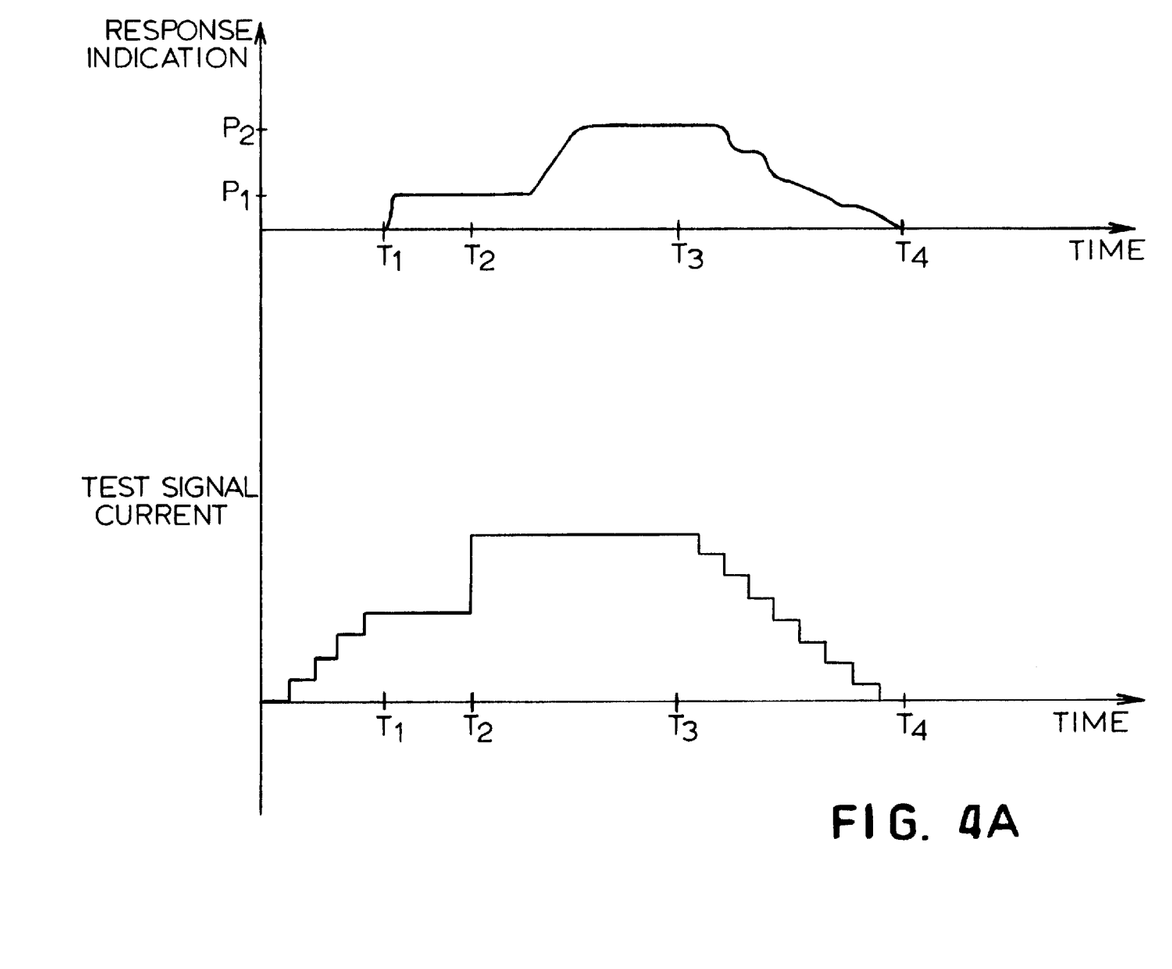
FIGS. 4A–4D comprise graphs of deterministic test signals used to measure parameters of a process control device according to the present invention.
Figure 4B:
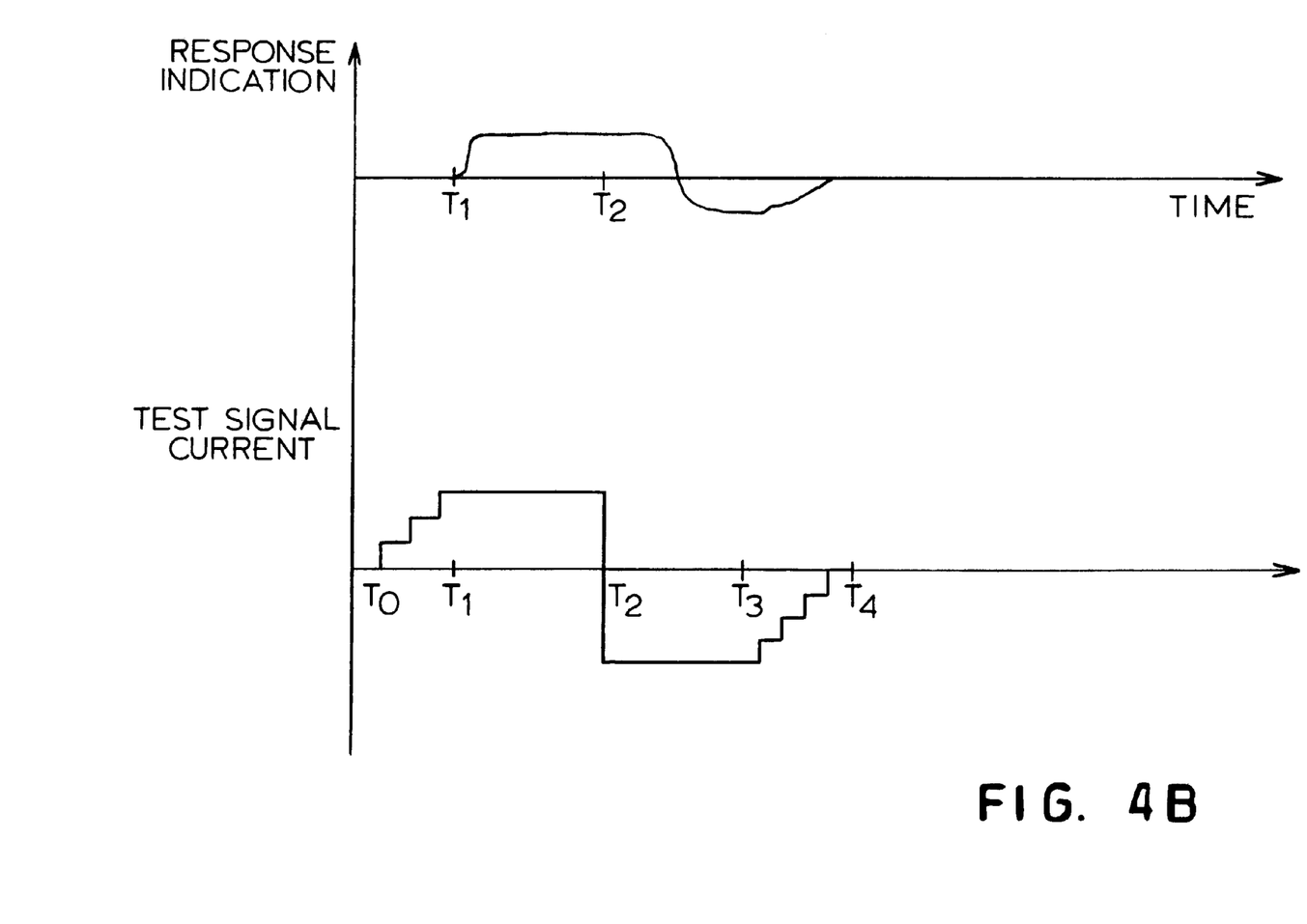
Figure 4C:
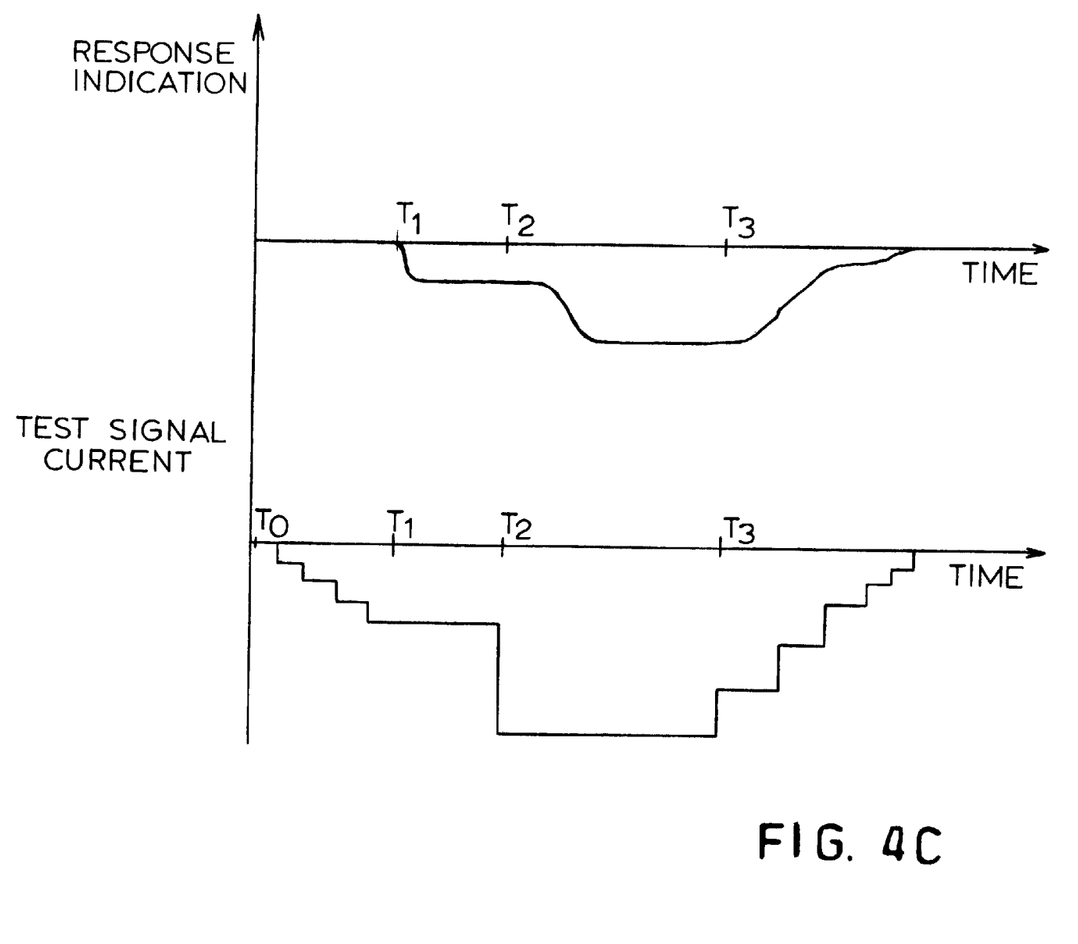
Figure 4D:
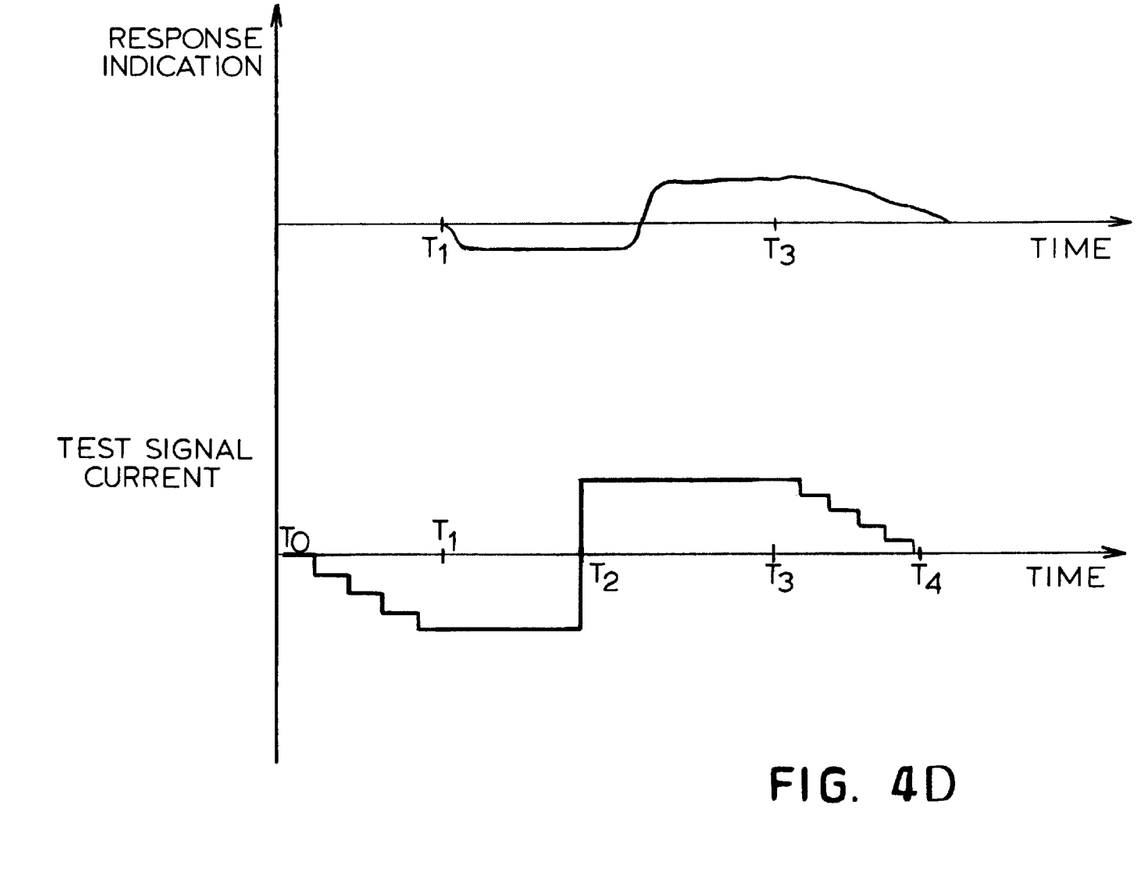

Referring now to FIG. 4A, the Up/Up test uses a diagnostic test signal comprising an initialization phase, a test phase, and a post-test phase and is intended to determine several device parameters when the valve is both at its upper dead band edge and moving up. As with the dead band test shown in FIG. 3, the diagnostic test routine is initiated at time $T_0$ at which time the diagnostic test signal enters the initialization phase. In the initialization phase, the diagnostic test signal is increased in either linear or variable rate steps (i.e., a ramped step signal) until movement of the valve element (or other process variable) is detected (i.e., until time $T_1$). At that point, the diagnostic test signal is held constant while the valve element position (or process variable) reaches a new, steady-state value, after which the test phase begins. During the test phase (at time $T_2$), a single, positive step having an amplitude equal to the dead band plus an amount corresponding to, for example, one percent of the range of valve element movement is applied to the process control device 13. The dead time, response time, overshoot, and gain may then be determined by the analyzer unit 29 as set forth hereinabove.

After the valve element position (or other process variable) reaches a new, steady-state condition (i.e., at time $T_3$), the diagnostic test enters the post-test phase wherein the diagnostic test signal may return to zero in a stair-step fashion at either a normal or an accelerated rate.

The Up/Down test (FIG. 4B) is similar to the Up/Up test with the exception that the diagnostic test signal comprises a single, negative step of equal magnitude. The Up/Down test measures the device parameters for downward valve element movement through the dead band. The Down/Down test (FIG. 4C) is, in turn, similar to the Up/Down test but with a ramped step signal having negative amplitude steps that move the valve element to the lower dead band edge before the single, negative step signal is applied. The Down/Down test measures the device parameters for downward valve element movement from its lower dead band edge. Lastly, the Down/Up test (FIG. 4D) uses a diagnostic test signal comprising a stepped-ramp signal having negative steps and a single, positive step as described in connection with the Up/Up test. The Down/Up test measures the device parameters for upward valve element movement through the dead band. The device parameter estimates obtained by these four tests may then be averaged or otherwise combined by the analyzer unit 29 to determine a statistical measurement of the dead time, response time, gain, and overshoot of the process control device 13.

Although the above description provides for the calculation of dead band, dead time, response time, gain, and overshoot of the process control device 13, the diagnostic test signals and response indications may be used to calculate other process control device parameters as well. More particularly, any other desired process control device parameter may be obtained as long as it may be obtained deterministically using a controlled diagnostic test signal and a measured response indication.

Because the process is still on-line, the diagnostic test signal may be limited in both time and magnitude to ensure that the process 20 is not interfered with to a detrimental extent. In the event that the control signal amplitude rarely changes more than ten percent, the extent to which the diagnostic test signal amplitude may deviate from the control signal amplitude (when the control signal is removed) may be quite small, such as less than about five percent of the control signal amplitude. Fortunately, it is usually not necessary for the process control device 13 to undergo a full stroke or test stroke sequence to determine the device parameters identified herein. In fact, in most cases, the device parameter may be estimated based on very small deviations from the control signal amplitude, such as less than about five percent and, preferably, less than about one percent. Furthermore, the maximum time allowed for the diagnostic test will be dependent on the process control device 13 and the process 20 involved, but usually will be less than about five seconds.

During the diagnostic test routine, the diagnostic test unit 27, or some component(s) thereof (such as the switch controller 25, signal generator 26, or the analyzer unit 29), may continue to monitor the control signal (or any other process variable or response indication) to ensure that the diagnostic test routine does not adversely effect the operation of the process 20. For example, the diagnostic test unit 27 may monitor the extent to which the amplitude of the diagnostic test signal deviates from the amplitude of the control signal (which may change during the diagnostic test). In the event that the deviation between the two amplitudes exceeds a predetermined amount, which may be set by a user, an operator or the diagnostic test unit 27, the diagnostic test unit 27 may interrupt or terminate the diagnostic test routine by directing the switch controller 25 to toggle the switch 14 to replace the diagnostic test signal with the control signal and/or by directing the signal generator 26 to generate a diagnostic test signal having an amplitude which returns to the present value of the control signal. The extent to which the diagnostic test signal may deviate from the control signal will depend upon the characteristics of the particular process 20 and the process control device 13 in which the diagnostic test unit 27 is used.

To further avoid adversely affecting the operation of the process 20, the diagnostic test routine according to the invention may operate in conjunction with a test apparatus capable of measuring the process control device parameters in a passive manner. For example, when the process 20 calls for relatively frequent modification of the control signal or the set point, data representative of the frequently changing control signal and the response indications thereto may be supplied to the analyzer unit 29 for calculation of the device parameters. In this case, the analyzer unit 29 must also include hardware, software, and/or firmware for initially analyzing the data to determine when and if the data may be used to calculate the desired device parameters.

In contrast, when the set point does not change frequently and, therefore, such a passive approach yields no data, it may be necessary to test the process control device 13 according to the present invention by disconnecting the controller 11 and applying a diagnostic test signal as set forth hereinabove.

It should be noted that the switch 14 may be disposed downstream of the current-to-pressure transducer 16 prior to a pneumatic positioner (not shown) or, alternatively, upstream as a component part of the controller 11. In the former case, the diagnostic test signal is a pneumatic signal. In the latter case, the same signal generator that generates the diagnostic test signal may be utilized to develop the control signal. As a result, the switch 14 should be understood to comprise a mechanism that merely replaces one signal for another signal by changing an output sequence. In yet another embodiment, the switch signal that toggles the switch 14 may be generated by a user, an operator or another controller (not shown) to manually force the initiation or termination of a diagnostic test routine.

While the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A diagnostic test unit for determining a device parameter associated with a process control device utilized in connection with an operating process to receive a control signal, the diagnostic test unit comprising:

a switch controller that monitors a process signal during operation of the operating process;

a signal generator that generates a diagnostic test signal;

a switch responsive to the switch controller to replace the control signal with the diagnostic test signal during operation of the operating process;

means for obtaining an indication of the response of the process control device to the diagnostic test signal; and an analyzer unit that determines the device parameter from the diagnostic test signal and the response indication.

2. The diagnostic test unit of claim 1, wherein the switch controller comprises means for determining whether the process signal is substantially stable.

3. The diagnostic test unit of claim 1, wherein the process signal is the control signal.

4. The diagnostic test unit of claim 1, wherein the process signal is representative of a process variable controlled by the process control device.

5. The diagnostic test unit of claim 1, wherein the process control device comprises a valve having a moveable valve member.

6. The diagnostic test unit of claim 5, further comprising a position sensor that generates a position signal representative of the position of the valve member and wherein the position signal is the process signal and the position signal is obtained by the obtaining means as the response indication.

7. The diagnostic test unit of claim 1, wherein the device parameter is dead band.

8. The diagnostic test unit of claim 7, wherein the diagnostic test signal comprises a ramped step signal.

9. The diagnostic test unit of claim 8, wherein the signal generator comprises means for varying a ramping rate of the diagnostic test signal.

10. The diagnostic test unit of claim 1, wherein the process control device has a dead band associated therewith and the diagnostic test signal comprises a step signal having an amplitude greater than the dead band.

11. The diagnostic test unit of claim 10, wherein the diagnostic test signal comprises an initialization phase having a ramped step signal to bring the process control device to an edge of the dead band.

12. The diagnostic test unit of claim 11, wherein the device parameter is selected from the group consisting of response time, dead time, gain, and overshoot.

13. The diagnostic test unit of claim 1, further comprising means for alerting a user when the device parameter fails to meet a predetermined criterion.

14. The diagnostic test unit of claim 1, wherein the signal generator includes means for providing a multiplicity of different diagnostic test signals and wherein the analyzer unit includes means for determining a device parameter estimate for each of the multiplicity of different diagnostic test signals and means for combining the device parameter estimates to calculate the device parameter.

15. The diagnostic test unit of claim 1, wherein the diagnostic test signal has an amplitude that deviates from an amplitude of the control signal by less than about five percent of a control signal range of the control signal.

16. The diagnostic test unit of claim 1, wherein the switch controller comprises a logic device responsive to the process signal that determines whether to initiate a diagnostic test.

17. A control valve having a moveable valve member utilized in connection with an operating process to receive a control signal, the control valve comprising:
   a switch controller that monitors a process signal during operation of the operating process;
   a signal generator that generates a diagnostic test signal;
   a switch responsive to the switch controller to replace the control signal with the diagnostic test signal during operation of the operating process;
   a position sensor in communication with the moveable valve member to generate a position signal representative of the position of the moveable valve member; and
   an analyzer unit that determines a device parameter from the diagnostic test signal and the position signal.

18. The control valve of claim 17, wherein the switch controller comprises means for determining whether the process signal is substantially stable.

19. The control valve of claim 17, wherein the process signal is the position signal.

20. The control valve of claim 17, wherein the switch controller comprises a logic device responsive to the process signal that determines whether to initiate a diagnostic test.

21. A method of determining a device parameter associated with a process control device while the process control device is utilized in connection with an operating process to receive a control signal, the method comprising the steps of:
   monitoring a process signal during operation of the operating process to determine whether the process signal is substantially stable;
   generating a diagnostic test signal;
   replacing the control signal with the diagnostic test signal during operation of the operating process if the process signal is substantially stable;
   receiving an indication of the response of the process control device to the diagnostic test signal; and
   determining the device parameter from the response indication.

22. The method of claim 21, further including the step of replacing the diagnostic test signal with the control signal subsequent to receiving the response indication.

23. The method of claim 21, wherein the diagnostic test signal comprises a ramped step signal.

24. The method of claim 23, wherein the ramped step signal comprises a first series of steps in a first direction and a second series of steps in a second direction, the device parameter is dead band, and the step of determining includes the steps of
   detecting a first amplitude of the diagnostic test signal at which a first change in the response indication during the first series of steps of the diagnostic test signal occurs,
   detecting a second amplitude of the diagnostic test signal at which a second change in the response indication during the second series of steps of the diagnostic test signal occurs, and
   determining the dead band from the first amplitude and the second amplitude.

25. The method of claim 21, wherein the process control device has a dead band and the diagnostic test signal comprises a first initialization phase having a ramped step signal to bring the process control device to a first edge of the dead band followed by a first test phase having a first step of an amplitude greater than the dead band.

26. The method of claim 25, wherein
   the diagnostic test signal further comprises a second initialization phase having a ramped step signal to bring the process control device to a second edge of the dead band step followed by a second test phase having a further step of an amplitude greater than the dead band,
   the receiving step comprises the steps of receiving a first response indication in response to the first step and a second response indication in response to the further step, and
   the determining step further comprises the step of combining first and second device parameter values calculated from the first response indication and the second response indication, respectively, to determine a statistical device parameter measurement.

27. The method of claim 21, wherein the device parameter is selected from the group consisting of dead time, response time, gain, and overshoot.

28. The method of claim 21, further comprising the steps of
   comparing the determined device parameter to a predetermined criterion, and
   alerting a user when the determined device parameter fails to meet the predetermined criterion.

29. The method of claim 21, wherein the process signal is the control signal.

30. The method of claim 29, further comprising the steps of
   comparing the amplitude of the control signal with the amplitude of the diagnostic test signal, and
   replacing the diagnostic test signal with the control signal if the diagnostic test signal amplitude deviates from the control signal amplitude by at least a predetermined amount.

31. The method of claim 29, further comprising the step of replacing the diagnostic test signal with the control signal if the control signal amplitude changes by at least a predetermined amount.

32. The method of claim 21, wherein the process control device comprises a valve having a moveable valve member for controlling a process variable associated with the operating process and the response indication is a position signal representative of the position of the valve member.

* * * * *